United States Patent
Huang et al.

(10) Patent No.: US 10,224,743 B2
(45) Date of Patent: Mar. 5, 2019

(54) POWER SELF-IDENTIFYING ENERGY HARVESTERS

(71) Applicant: Intel Corporation, Santa Clara, CA (US)

(72) Inventors: Lilly Huang, Portland, OR (US); Wayne L. Proefrock, Hillsboro, OR (US); Michael Boyd, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 14/551,459

(22) Filed: Nov. 24, 2014

(65) Prior Publication Data

US 2016/0149439 A1    May 26, 2016

(51) Int. Cl.
*H01H 3/00* (2006.01)
*H02J 13/00* (2006.01)
*H02J 1/06* (2006.01)

(52) U.S. Cl.
CPC .......... *H02J 13/0003* (2013.01); *H01H 3/00* (2013.01); *H02J 1/06* (2013.01); *Y02B 90/228* (2013.01); *Y04S 20/18* (2013.01)

(58) Field of Classification Search
CPC .......... H01H 3/00; H01H 35/00; H01H 37/00
USPC ....................................................... 307/116
See application file for complete search history.

(56) References Cited

U.S. PATENT DOCUMENTS

| | | | | |
|---|---|---|---|---|
| 7,508,248 | B2 * | 3/2009 | Yoshida ................... | H02J 7/32 327/365 |
| 7,781,943 | B1 * | 8/2010 | Hamel .................. | H02N 2/181 310/339 |
| 7,834,483 | B2 * | 11/2010 | Kearney-Fischer .... | H02S 40/44 307/113 |
| 9,197,143 | B1 * | 11/2015 | Townsend ............. | H02N 2/181 |
| 9,413,289 | B2 * | 8/2016 | Ito | |
| 9,450,434 | B2 * | 9/2016 | Bottarel .................... | H02J 7/32 |
| 2008/0203823 | A1 * | 8/2008 | Deppe .................... | H02N 2/181 307/78 |
| 2009/0085409 | A1 * | 4/2009 | Kearney-Fischer .... | H02S 40/44 307/115 |
| 2011/0051641 | A1 * | 3/2011 | Pan ......................... | H04Q 9/00 370/311 |
| 2011/0133939 | A1 * | 6/2011 | Ranganathan ....... | A61B 5/0008 340/584 |
| 2014/0265573 | A1 * | 9/2014 | Kreutzman ........... | F24H 1/0018 307/31 |
| 2015/0162802 | A1 * | 6/2015 | Horseman ........... | G06F 19/3481 700/287 |

(Continued)

*Primary Examiner* — Adi Amrany
(74) *Attorney, Agent, or Firm* — Jordan IP Law, LLC

(57) ABSTRACT

Systems and methods may provide for an energy harvester to power a mobile device. The energy harvester may include an energy harvesting portion to generate electrical power. At least one sensor may measure an environmental condition relating to generation of electrical power by the energy harvesting portion. A controller may generate a signal based on the measured environmental condition by the at least one sensor to the mobile device. Alternatively the signals from the at least one sensor are place in a memory on the energy harvester. In one example, the controller determines the power generated by the energy harvester and the controller signal includes this power information.

20 Claims, 6 Drawing Sheets

(56) References Cited

U.S. PATENT DOCUMENTS

2015/0189705 A1* 7/2015 Ghosh .................. H02J 3/38
315/161
2015/0287562 A1* 10/2015 Delamare ............... H02N 2/18
307/125

* cited by examiner

POWER SELF-IDENTIFYING ENERGY HARVESTERS

TECHNICAL FIELD

Embodiments generally relate to power delivery. More particularly, embodiments relate to power self-identifying energy harvesters.

BACKGROUND

A majority of mobile devices may operate under DC (direct current) regulated voltage supply. These devices may shut down or malfunction if the voltage provided by a power source varies, which may often occur when the power source is a photovoltaic (PV, e.g., solar) panel or other type of energy harvester. In a case where a mobile device is connected to a power source that supplies insufficient power or unregulated voltage, the mobile device may run into an unstable operation state, or, power oscillation.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
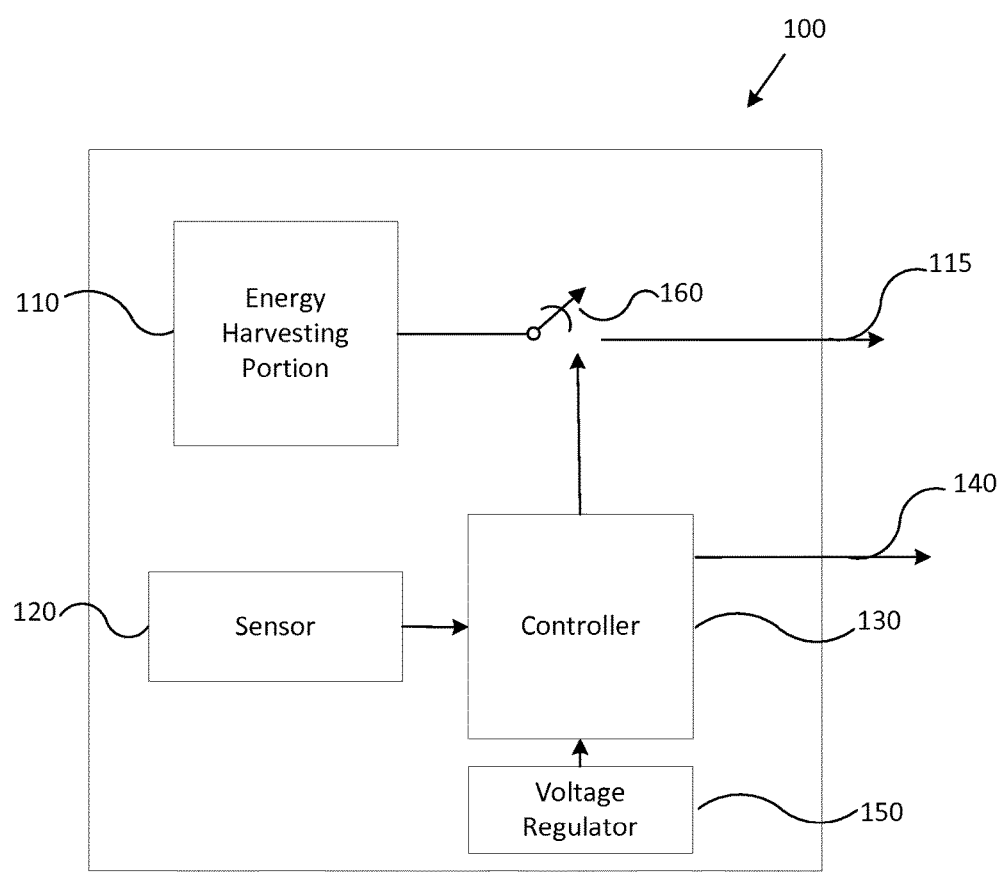
FIG. 1 is a block diagram of an example of an energy harvester according to an embodiment.

Turning now to FIG. 1, an energy harvester 100 is shown. The energy harvester 100 may be, for example, a photovoltaic energy harvester, or other energy harvester for generating electric power. The energy harvester 100 includes an energy harvesting portion 110; the generated electric power is represented by arrow 115. Exemplary energy harvesting portions include a photovoltaic energy harvesting portions such as a solar cell array. The energy harvester further includes at least one sensor 120 that measures a condition relating to the generation of electric power by the energy harvesting portion 110, particularly an environmental condition. For an energy harvester with a photovoltaic energy harvesting portion, the sensor 120 may be a light sensor/photodiode and/or a temperature sensor. For an energy harvester with a piezoelectric energy harvesting portion, the sensor 120 may be a vibration sensor.

The illustrated sensor 120 communicates with a controller 130 in order to provide the measured condition to the controller/memory 130. As used herein, the term "controller" broadly describes any device that can receive the measured condition from the sensor 120 and optionally generate a signal 140 based at least in part on the measured condition or transmit the received measured condition. The controller can optionally generate a signal carrying the measured condition data or the controller can calculate the power generated by the energy harvester 100 based on the measured condition and place this calculated power data on the generated signal 140. Thus, the signal 140 includes information from which the power-generating capability of the energy harvester 100 is determined either directly (calculated by the controller 130) or indirectly (from the measured condition), such that the energy harvester 100 is a power self-identifying energy harvester. Alternatively, the controller/memory 130 could be a memory device that stores the measured conditions from the one or more sensors 120; the memory would be read by an external device for determining the power-generating capability of the energy harvester 100.

Exemplary devices for the controller/memory 130 include integrated circuits, integrated memory and control devices, memory devices, and any other devices that are capable of receiving information from the sensor and optionally generating a signal based on the information. Optionally, the controller/memory 130 and the one or more sensors 120 may be integrated on an Application Specific Integrated Circuit (ASIC).

A voltage regulator 150 may regulate the voltage supplied to the controller 130 and sensors 120. The controller/memory 130 is optionally powered by the energy harvesting portion 110, thus the voltage regulator may regulate the voltage output by the energy harvesting portion to the controller/memory 130. In an optional embodiment, the energy harvester 100 includes a switch 160. In cooperation with the controller/memory 130, as represented by communication path 135, the switch 160 is configured to be closed (supplying power) when the energy harvester 100, typically through controller 130, determines that it is generating sufficient electric power to power a mobile device. Similarly, the switch is configured to be open when the energy harvester 100 determines that it is not generating sufficient electric power to power a mobile device. In this manner, undesirable power cycling in a mobile device due to an insufficient power supply is avoided.

Figure 2:
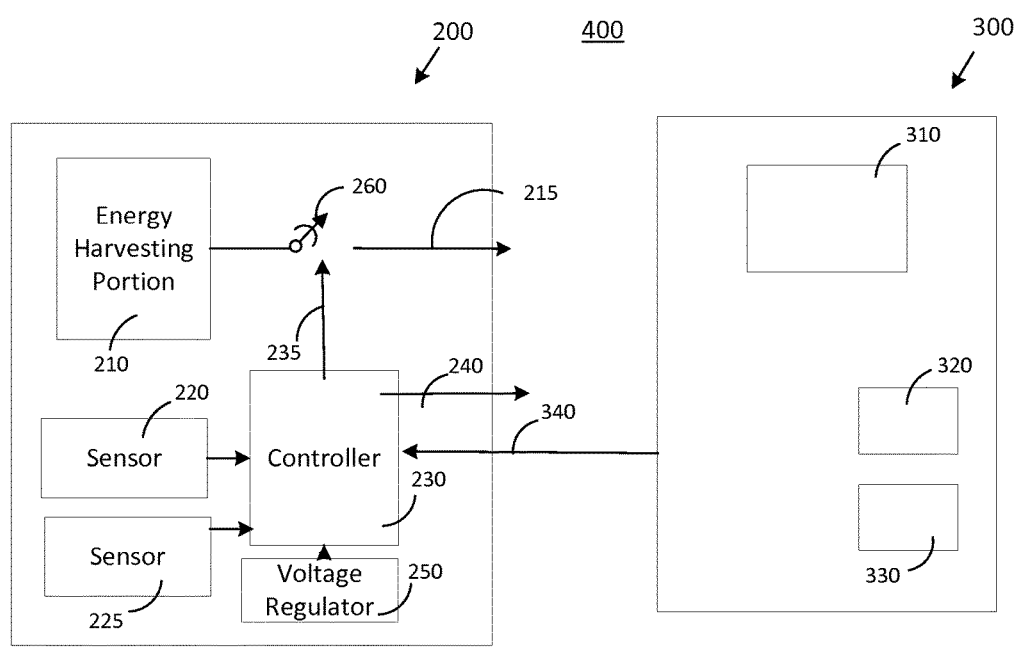
FIG. 2 is a block diagram of a system according to an embodiment.

FIG. 2 depicts a system 400 including a photovoltaic energy harvester 200 and a mobile device 300. The photovoltaic energy harvester 200 includes a photovoltaic energy harvesting portion 210 that includes photovoltaic cells to convert incident radiation to electric power, indicated by arrow 215. Optionally, connectors are provided such that additionally energy harvesting portions may be connected to the energy harvester 200. The illustrated photovoltaic energy harvester 200 includes a light sensor 220 and a temperature sensor 225, both of which may output sensing information to a controller/memory 230. The controller/memory 230 may generate a signal 240 based on the sensing information. The information from sensors 220 and 225 may be used by the controller/memory 230 to determine the electric power generation capability of the energy harvester 200. For example, the temperature and the amount of radiation incident on the energy harvester 200 may both be used to determine the amount of power the energy harvester can supply. Photovoltaic harvested energy is a variable current source the strength of which depends on ambient light radiation. A key difference between the energy harvester 200 and a conventional DC power supply is that the energy harvester 200 may have a limited energy capacity and un-regulated voltage that varies according to ambient conditions.

The determination of the amount of power the energy harvester device 200 can generate may be made by the controller/memory 230 or it may be made in the mobile device. That is, a signal 240 may include the light sensor and temperature sensor information obtained directly from the sensors 220 or 225 or it may include a power level determined by the controller/memory 230. Alternatively, the mobile device may read sensor information from the controller/memory 230 and determine the amount of power that energy harvester 200 can supply.

A mobile device 300 may include one or more of a display 310, a processor 320, or a memory device 330. In an optional embodiment, the mobile device 300 may communicate its power needs to the photovoltaic energy harvester 200 or vice versa. Such a communication is indicated by signal 340 or/and 240, which may include one or more of information regarding $P_{SYS\_MIN}$ (W) and/or $V_{SYS\_NOR}$ (V) that relate to the minimum power required for operation by the mobile device 300 and the normal system voltage of the mobile device 300. In this embodiment, the controller/memory 230 includes a receiver or receiving portion that is capable of receiving the signal 340 from the mobile device 300. Alternatively, the photovoltaic energy harvester 200 includes information regarding the power needs of the mobile device 300 in the controller/memory 230 and the mobile device 300 does not provide this information to the energy harvester 200. In a further alternative, information regarding sensing information is stored in controller/memory 230 and is read out by the mobile device 300.

The illustrated photovoltaic energy harvester 200 includes a voltage regulator 250 to regulate a voltage supplied to the controller/memory 230 and sensors 220, 225 when the controller/memory 230 is powered from the photovoltaic energy harvesting portion 210. A switch 260 is optionally included to permit electric power to pass to the mobile device 300 when the power generated by photovoltaic energy harvester 200 is sufficient to power the mobile device 300. Alternatively, a mechanism to permit or block power flow from the energy harvester 200 may be provided within the mobile device 300 in communication with the signal 240 indicating the power generating capability of the energy harvester 200 or in connection with the reading of the information in the controller/memory 230.

Although depicted as separate lines in FIG. 2, the signals 215, 240 from the photovoltaic energy harvester 200 and the signal 340 from the mobile device 300 may be provided on the same or different physical media/interface such as a cable or cables connected between the harvester and the mobile device. Any type of interface capable of carrying the signal or signals may be used in system 400. Exemplary interfaces include a one-wire series communication, two-wire series communication, or USB (Universal Serial Bus, e.g., USB Specification 3.0, Rev. 1.0, Nov. 12, 2008, USB Implementers Forum).

Figure 3A:
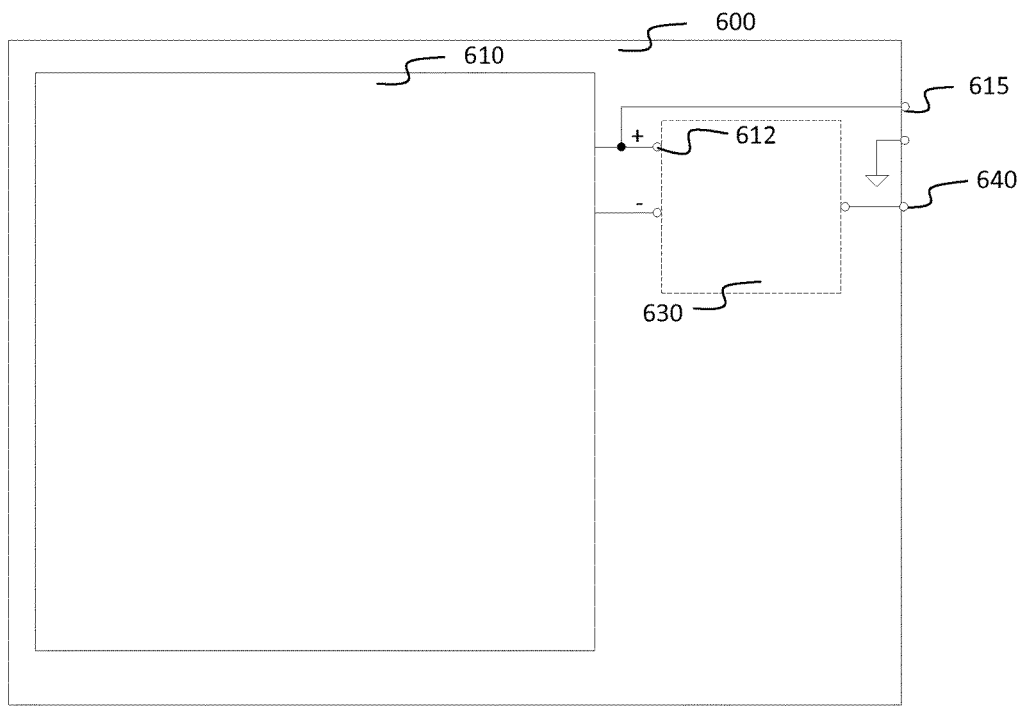
FIG. 3A is a block diagram of an energy harvester according to an embodiment.
Figure 3B:
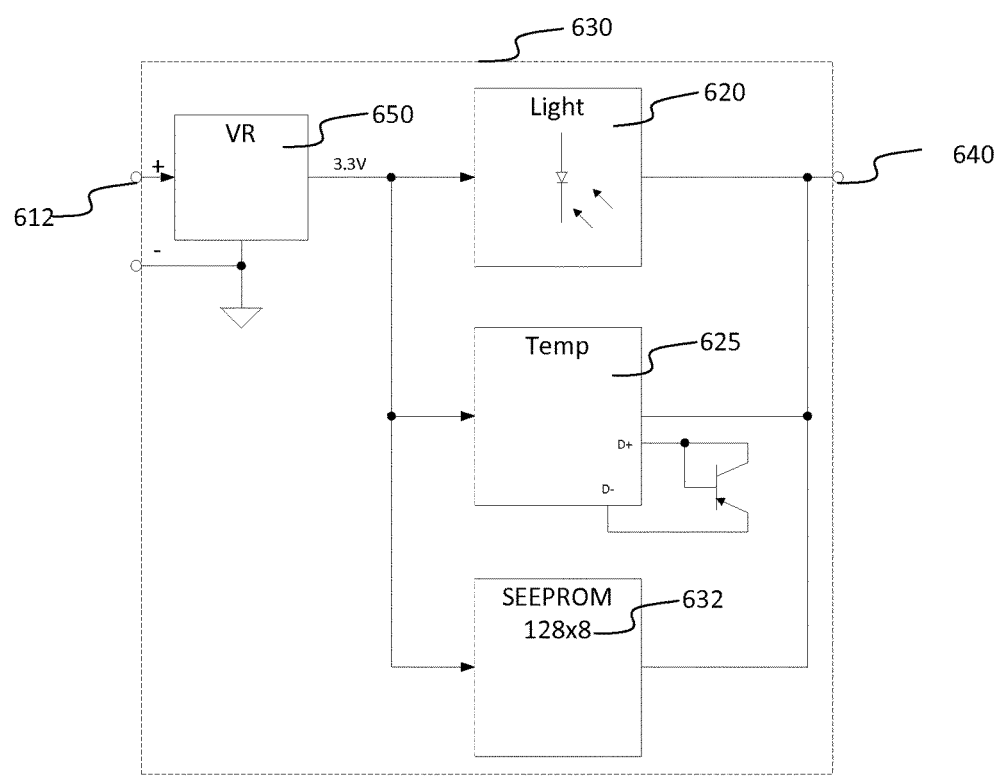
FIG. 3B is an enlarged view of a portion of the embodiment of FIG. 3A.

A further embodiment of a photovoltaic energy harvester is depicted in the block diagrams of FIGS. 3A and 3B. In FIG. 3A, the energy harvester 600 includes a photovoltaic energy harvesting portion 610. An integrated sensor and controller/memory unit 630 receives power from the photovoltaic energy harvesting portion 610 via an input 612. An output signal is sent via output port 640; alternatively port 640 is used by a mobile device to read the information regarding the temperature and light sensor stored in a memory device. The power flows to output 615 from the photovoltaic energy harvesting portion 610. The integrated sensor and controller/memory unit 630 is depicted in FIG. 3B. The integrated unit 630 includes light sensor 620, temperature sensor 625 and serial memory 632. In this embodiment, a voltage regulator 650 exists to power on integrated unit 630 components using the DC output of the photovoltaic energy harvesting portion 610 directly as a power source through input 612. Integrated unit 630 will operate providing that the photovoltaic harvested energy is sufficient to run the voltage regulator. If the harvested energy output is sufficient then the sensors 620 and 625 and memory 632 can be read by an external controller (for example, in the mobile device 300) via a serial interface or some form of communication interface depending on the number of wires/connections provided via port 640. Contained in the serial memory 632 may be specific parameters about the energy harvester 600 such as the maximum power output (Pmax), voltage level at the Pmax (Vmp), current amount at the Pmax (Imp), the short-circuit current (Isc), the open-circuit voltage (Voc), temperature coefficients of the previous data and other information about the energy harvester 600 such as a manufacturer and/or production date. Sensors 620 and 625 may be read to convey the amount of light on the energy harvester 600 and the temperature on the energy harvester 600 depending on sensor placement. This information may be used for estimating panel output and estimating the current external environment.

Figure 4:
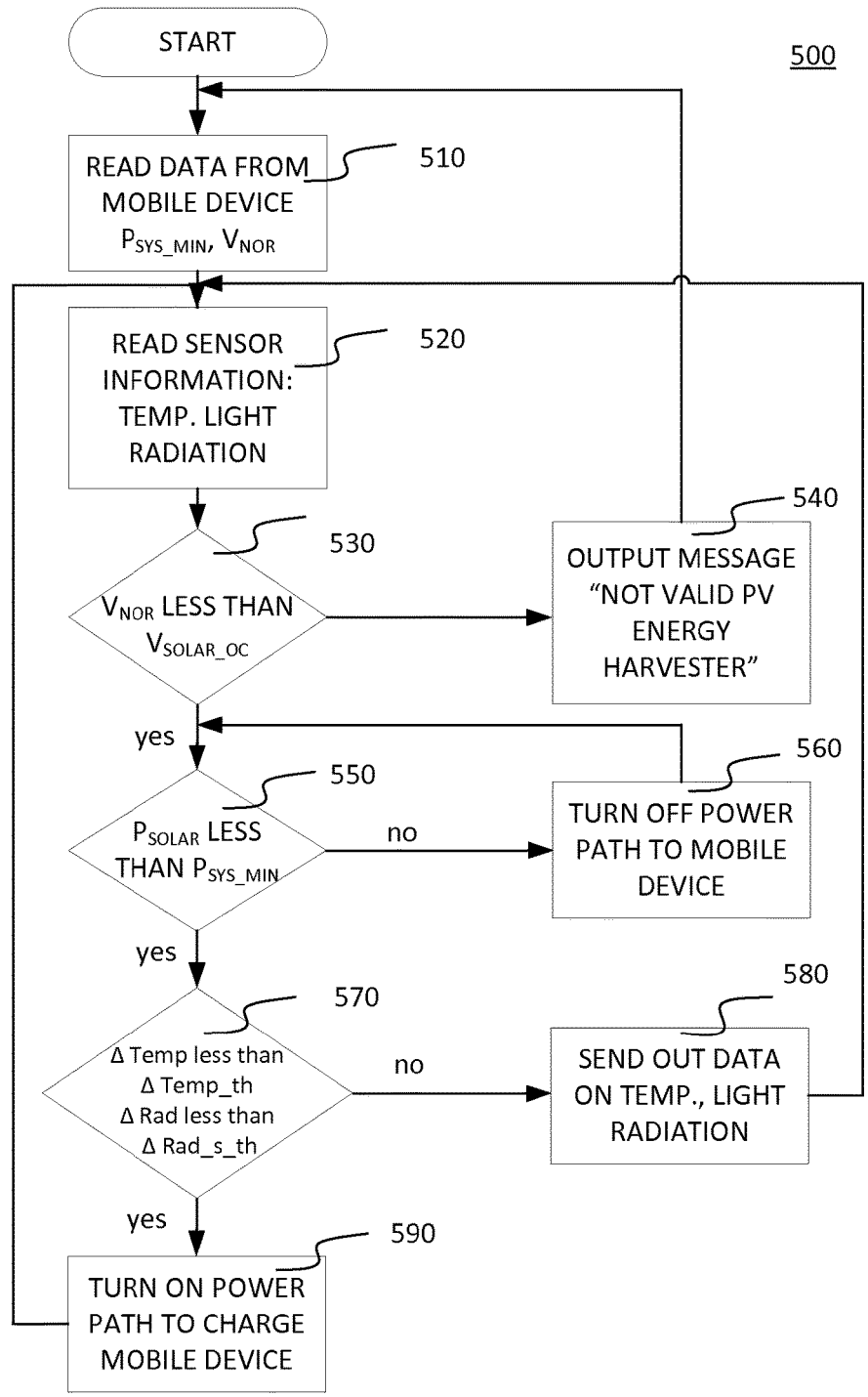
FIG. 4 is a flowchart of an example of a method of operating an energy harvester according to an embodiment.

As an example, a flowchart of a method 500 is provided in FIG. 4 showing an optional operation procedure for the system 400 (FIG. 2). The method 500 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

With continuing reference to FIGS. 2 and 3, the illustrated method 500 is only one example of the operation of system 400 and the various blocks of FIG. 4 may take place in a different order or concurrently with other blocks shown in the flowchart. The energy harvester begins the process of the method 500 with the switch 260 in an open position (no power flowing to the mobile device). As an example, in illustrated block 510, the photovoltaic energy harvester 200 reads data $P_{SYS\_MIN}$ and/or $V_{SYS\_NOR}$ regarding the power requirements of mobile device 300. In block 520, the sensor information regarding temperature and radiation is read by the controller/memory 230. From this information, the controller/memory 230 may estimate or derive the power and voltage that is going to be generated by the photovoltaic energy harvester 200. The generated voltage may be compared to the required voltage at block 530 where it is determined whether $V_{NOR}$ of the mobile device is less than $V_{SOLAR\_OC}$, the generated voltage of the energy harvester 200. If the voltage is not sufficient, the energy harvester 200 may generate a message indicating that it is not a valid power source at block 540. This message may be in the form of an optional displayed message that can be output by either the energy harvester or the display 310 of the mobile device.

If the voltage is sufficient, the generated power may be compared to the required power at block 550, that is, whether $P_{SOLAR}$ is less than $P_{SYS\_MIN}$. If the power is insufficient, the controller 230 may maintain the switch 260 in an open position to impede the power path to the mobile device at block 560 (or close the switch if it has been previously in an open position). If the power is sufficient, the changes in temperature and radiation may be compared with threshold levels of change in temperature (defined as ΔTemp_th) and radiation (defined as Δrad_s_th) at block 570. If the temperature and radiation level changes are greater than the threshold level, the information is output at block 580. If the temperature and radiation change levels are less than the threshold level, the controller/memory 230 closes switch 260 to permit electrical power to flow to mobile device 300 at block 590.

Figure 5B:
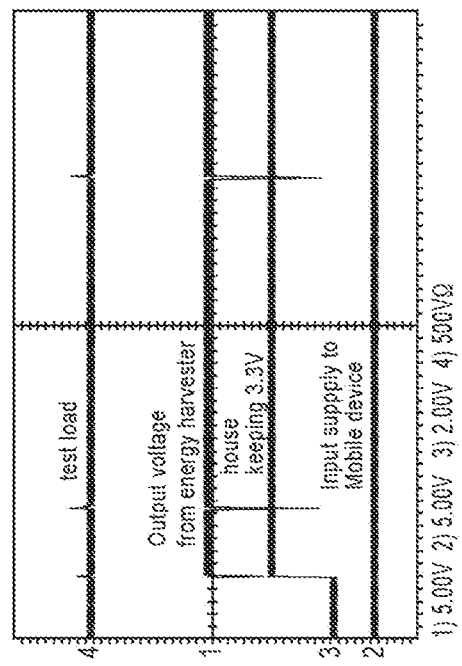
FIGS. 5A and 5B are plots of examples of output voltages from an energy harvester according to an embodiment.
Figure 5A:
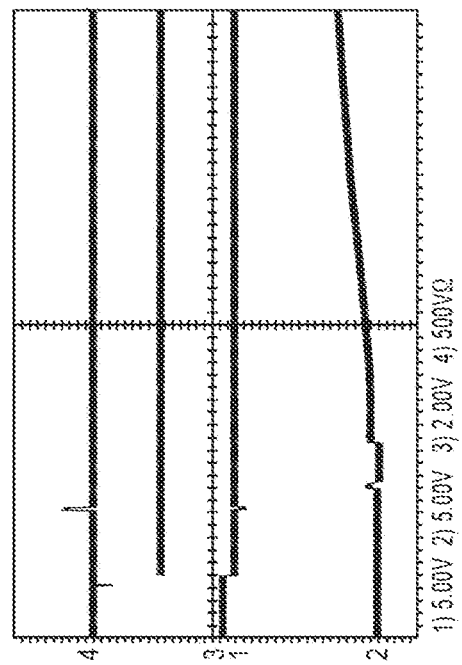

Advantageously, the illustrated method 500 removes power oscillation in a mobile device, even under a weak solar source. As seen in FIG. 5A depicting conditions for a strong solar source, there is steady input supply to the mobile device and a steady output voltage from the solar panel. Similarly, in FIG. 5B depicting conditions for a weak solar source, there is also a steady input supply to the mobile device and a steady output voltage from the solar panel. This condition exists because the power may flow to the mobile device only when the energy harvester is producing sufficient electric power to power the mobile device, preventing power cycling in the mobile device.

ADDITIONAL NOTES AND EXAMPLES

Example 1 may include an energy harvester to power a mobile device comprising an energy harvesting portion to generate electrical power, at least one sensor to measure an environmental condition relating to generation of electrical power by the energy harvesting portion, and a controller to generate a signal based on the measured environmental condition by the at least one sensor to the mobile device.

Example 2 may include the energy harvester of Example 1 wherein the energy harvesting portion is a photovoltaic energy harvesting portion.

Example 3 may include the energy harvester of Examples 1 or 2 wherein the at least one sensor is a light sensor and the measured condition is incident radiation.

Example 4 may include the energy harvester of Examples 1 or 2, wherein the at least one sensor is a thermal sensor and the measured condition is temperature.

Example 5 may include the energy harvester of Example 1, wherein the energy harvesting portion is a piezoelectric energy harvesting portion.

Example 6 may include the energy harvester of Examples 1 or 5, wherein the at least one sensor is a vibration sensor.

Example 7 may include the energy harvester of Examples 1, 2, or 5 wherein the controller further comprises a receiver to receive a signal relating to power requirements of the mobile device.

Example 8 may include the energy harvester of Example 7, further comprising a switch positioned between the energy harvesting portion and a power output of the energy harvester. The controller is to activate the switch when the controller determines that the energy harvester can generate sufficient power to meet the power requirements of the mobile device.

Example 9 may include the energy harvester of Example 7, further comprising a switch positioned between the energy harvesting portion and a power output of the energy harvester. The controller is to deactivate the switch when the controller determines that the energy harvester cannot generate sufficient power to meet the power requirements of the mobile device.

Example 10 may include the energy harvester of Examples 1, 2, or 5 wherein the signal and the generated electrical power are to be supplied to the mobile device on a same physical medium.

Example 11 may include the energy harvester of Examples 1, 2, or 5 wherein the signal and the generated electrical power are to be supplied to the mobile device on different physical media.

Example 12 may include the energy harvester of Examples 1, 2, or 5 further comprising one or more connectors to couple additional energy harvesting portions to the energy harvester.

Example 13 may include a method of supplying electrical power generated by an energy harvester to a mobile device comprising measuring one or more environmental conditions relating to the generation of electrical power by an energy harvesting portion of an energy harvester, generating a signal based on the measured condition and outputting the signal to a mobile device or storing the measured condition in a memory, and supplying electrical power generated by the energy harvesting portion to the mobile device.

Example 14 may include the method of Example 13, wherein the energy harvesting portion is a photovoltaic or piezoelectric energy harvesting portion.

Example 15 may include the method of Examples 13 or 14, wherein the energy harvesting portion is a photovoltaic energy harvesting portion and the measured environmental conditions are at least one of incident radiation or temperature.

Example 16 may include the method of Examples 13 or 14, further comprising receiving a signal from the mobile device regarding the power requirements of the mobile device.

Example 17 may include the method of Example 16, wherein supplying electrical power generated by the energy harvesting portion to the mobile device occurs when the energy harvester determines, from the measured condition, that the energy harvester can meet the power requirements of the mobile device.

Example 18 may include a system comprising a mobile device including one or more of a processor, a memory device, or a display. An energy harvester is coupled to the mobile device to generate and supply electric power to the mobile device. The energy harvester comprises an energy harvesting portion to generate electrical power to deliver to a mobile device, at least one sensor to measure a condition relating to generation of electrical power by the energy harvesting portion, and a signal generator to generate a signal based on the measured condition to the mobile device or a memory to store the measured condition.

Example 19 may include the system of Example 18, wherein the energy harvesting portion is a photovoltaic energy harvesting portion and the at least one sensor is selected from a light sensor or a temperature sensor.

Example 20 may include the system of Examples 18 or 19, wherein the energy harvester further comprises a receiver to receive a signal relating to power requirements of the mobile device.

Example 21 may include the system of Example 20, further comprising a switch to enable power flow from the energy harvester to the mobile device when the energy harvester determines that it can generate sufficient power to meet the power requirements of the mobile device and to block electrical power flow to the mobile device when the energy harvester determines that it cannot generate sufficient power to meet the power requirements of the mobile device.

Example 22 may include the system of Example 18, wherein the signal and the generated electrical power are to be supplied to the mobile device on a same physical medium.

Example 23 may include the system of Example 18, wherein the signal and the generated electrical power are to be supplied to the mobile device on different physical media.

Example 24 may include an energy harvester for supplying electrical power to a mobile device including means for measuring one or more environmental conditions relating to the generation of electrical power by an energy harvesting means of an energy harvester. The energy harvester further includes means for generating a signal based on the measured condition and outputting the signal to a mobile device and means for supplying electrical power generated by the energy harvesting means to the mobile device.

Example 25 may include the energy harvester for supplying electrical power to a mobile device according to Example 24 wherein the energy harvesting portion is a means for generating photovoltaic energy or a means for generating piezoelectric energy.

Example 26 may include the energy harvester for supplying electrical power to a mobile device according to Examples 24 or 25 wherein the means for measuring one or more environmental conditions is a means for measuring incident radiation or a means for measuring temperature.

Example 27 may include the energy harvester for supplying electrical power to a mobile device according to Examples 24 or 25 further comprising means for receiving a signal from the mobile device regarding the power requirements of the mobile device.

Example 28 may include the energy harvester for supplying electrical power to a mobile device according to Examples 24 or 25 further comprising switching means for supplying electrical power generated by the energy harvesting means to the mobile device when the energy harvester determines, from the measured condition, that the energy harvester can meet the power requirements of the mobile device.

Example 29 may include the energy harvester for supplying electrical power to a mobile device according to Examples 24 or 25 further comprising means for delivering a signal based on the measured condition and the generated electrical power together to the mobile device.

Example 30 may include the energy harvester for supplying electrical power to a mobile device according to Examples 24 or 25 further comprising means for delivering a signal based on the measured condition and the generated electrical power separately to the mobile device.

Thus, the power self-identifying energy harvesters described herein may monitor power generated by an energy harvesting portion and provide power to a mobile device when the power is sufficient to power a mobile device. As a result a cost-effective energy harvester that prevents undesirable power oscillations may be achieved for mobile devices such as tablet computers, convertible tablets, mobile phones, personal digital assistants, and various other portable or handheld devices. The techniques may reduce the cost of a mobile device by eliminating the need for certain guard bands in the mobile device.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An energy harvester to power a mobile device comprising:
   an energy harvesting portion to generate electrical power;
   at least one sensor to measure an environmental condition relating to the generation of the electrical power by the energy harvesting portion;
   a switch positioned between the energy harvesting portion and a power output of the energy harvester to permit or block a power flow of the electrical power from the energy harvesting portion to the mobile device; and
   a controller to:
   generate a signal based on the measured environmental condition by the at least one sensor, adjust a first threshold, that is a minimum power to avoid power cycling in the mobile device during powering of the mobile device, based upon power requirements of the mobile device, determine a value, that is an estimation of power that is to be generated by the energy harvesting portion, from the measured environmental condition, identify a change in the measured environmental condition, and control the switch to permit the power flow to power the mobile device with the generated electrical power only when:

the controller determines that the energy harvesting portion can generate sufficient power to meet the power requirements to avoid the power cycling in the mobile device by comparing the first threshold to the value, and the controller determines that the change is below a second threshold.

2. The energy harvester according to claim 1, wherein the energy harvesting portion is a photovoltaic energy harvesting portion.

3. The energy harvester according to claim 2, wherein the at least one sensor is a light sensor and the measured environmental condition is incident radiation.

4. The energy harvester according to claim 2, wherein the at least one sensor is a thermal sensor and the measured environmental condition is temperature.

5. The energy harvester according to claim 1, wherein the energy harvesting portion is a piezoelectric energy harvesting portion.

6. The energy harvester according to claim 5, wherein the at least one sensor is a vibration sensor.

7. The energy harvester according to claim 1, wherein the controller further comprises a receiver to receive a signal relating to the power requirements of the mobile device.

8. The energy harvester according to claim 1, wherein the controller is to deactivate the switch to block the power flow when the controller determines that the energy harvesting portion cannot generate sufficient power to meet the power requirements of the mobile device by comparing the first threshold to the value or determining that the change is above the second threshold.

9. The energy harvester according to claim 1, wherein the signal and the generated electrical power are to be supplied to the mobile device on a same physical medium.

10. The energy harvester according to claim 1, wherein the signal and the generated electrical power are to be supplied to the mobile device on different physical media.

11. The energy harvester according to claim 1, further comprising one or more connectors to couple additional energy harvesting portions to the energy harvester.

12. A method of supplying electrical power generated by an energy harvester to a mobile device comprising:

generating the electrical power by an energy harvesting portion of the energy harvester;

measuring one or more environmental conditions relating to the generation of the electrical power;

generating signals based on the measured one or more environmental conditions and outputting the signals to the mobile device, or storing the measured one or more environmental conditions in a memory;

adjusting a first threshold, that is a minimum power to avoid power cycling in the mobile device during powering of the mobile device, based upon power requirements of the mobile device;

determining a value, that is an estimation of power that is to be generated by the energy harvesting portion, from the measured one or more environmental conditions;

determining whether the energy harvesting portion can generate sufficient power to meet the power requirements to avoid the power cycling in the mobile device by comparing the value to the first threshold;

identifying a change in the one or more measured environmental conditions;

supplying the electrical power generated by the energy harvesting portion to the mobile device to power the mobile device only when:

it is determined that the energy harvesting portion can generate sufficient power to avoid the power cycling, and it is determined that the change is below a second threshold.

13. The method according to claim 12, wherein the energy harvesting portion is a photovoltaic or piezoelectric energy harvesting portion.

14. The method according to claim 12, wherein the energy harvesting portion is a photovoltaic energy harvesting portion and the one or more measured environmental conditions are at least one of incident radiation or temperature.

15. A system comprising:

a mobile device including one or more of a processor, a memory device, or a display;

an energy harvester coupled to the mobile device to generate and supply electrical power to the mobile device, the energy harvester comprising:

an energy harvesting portion to generate the electrical power;

at least one sensor to measure an environmental condition relating to the generation of the electrical power by the energy harvesting portion;

a switch positioned between the energy harvesting portion and a power output of the energy harvester to permit or block a power flow of the electrical power from the energy harvesting portion to the mobile device; and a controller including:

a signal generator to generate a signal based on the measured environmental condition that is to be provided to the mobile device, or a memory to store the measured environmental condition, wherein the controller is to:

adjust a first threshold, that is a minimum power to avoid power cycling in the mobile device during powering of the mobile device, based upon power requirements of the mobile device, determine a value, that is an estimation of power that is to be generated by the energy harvesting portion, from the measured environmental condition, identify a change in the measured environmental condition, control the switch to permit the power flow to power the mobile device with the generated electrical power only when:

the controller determines that the energy harvesting portion can generate sufficient power to meet the power requirements to avoid the power cycling in the mobile device by comparing the first threshold to the value, and the controller determines that the change is below a second threshold.

16. The system according to claim 15, wherein the energy harvesting portion is a photovoltaic energy harvesting portion and the at least one sensor is selected from a light sensor or a temperature sensor.

17. The system according to claim 15, wherein the energy harvester further comprises a receiver to receive a signal relating to the power requirements of the mobile device.

18. The system according to claim 15, wherein the controller is to control the switch to block the power flow to the mobile device when the controller determines that the energy harvesting portion cannot generate sufficient power to meet the power requirements of the mobile device by comparing the first threshold to the value or determining that the change is above the second threshold.

19. The system according to claim 15, wherein the signal and the generated electrical power are to be supplied to the mobile device on a same physical medium.

20. The system according to claim 15, wherein the signal and the generated electrical power are to be supplied to the mobile device on different physical media.

* * * * *